June 8, 1971 H. C. MILLER 3,583,035
MULTIPLE CAVITY HOT PRESS MOLD STRUCTURE FOR
DIAMOND-IMPREGNATED ABRASIVE SAW TEETH
SEGMENTS AND THE LIKE
Filed March 19, 1969 5 Sheets-Sheet 1

INVENTOR
HAROLD C. MILLER
By *Norman R Gerlach*
Attorney

June 8, 1971

H. C. MILLER 3,583,035

MULTIPLE CAVITY HOT PRESS MOLD STRUCTURE FOR
DIAMOND-IMPREGNATED ABRASIVE SAW TEETH
SEGMENTS AND THE LIKE

Filed March 19, 1969

INVENTOR:
HAROLD C. MILLER

By *Harold P. Gerlach*

Attorney

June 8, 1971  H. C. MILLER  3,583,035
MULTIPLE CAVITY HOT PRESS MOLD STRUCTURE FOR
DIAMOND-IMPREGNATED ABRASIVE SAW TEETH
SEGMENTS AND THE LIKE
Filed March 19, 1969  5 Sheets-Sheet 3

INVENTOR:
HAROLD C. MILLER
By *Jimmy T Gerlach*
Attorney

June 8, 1971  H. C. MILLER  3,583,035
MULTIPLE CAVITY HOT PRESS MOLD STRUCTURE FOR
DIAMOND-IMPREGNATED ABRASIVE SAW TEETH
SEGMENTS AND THE LIKE
Filed March 19, 1969  5 Sheets-Sheet 5

INVENTOR
HAROLD C. MILLER
By *Norman F. Gerlach*
Attorney

United States Patent Office 3,583,035
Patented June 8, 1971

3,583,035
MULTIPLE CAVITY HOT PRESS MOLD STRUCTURE FOR DIAMOND-IMPREGNATED ABRASIVE SAW TEETH SEGMENTS AND THE LIKE
Harold C. Miller, Chicago, Ill., assignor to Super-Cut, Inc., Chicago, Ill.
Filed Mar. 19, 1969, Ser. No. 808,512
Int. Cl. B30b 11/00
U.S. Cl. 18—17                                                                                   15 Claims

ABSTRACT OF THE DISCLOSURE

An electrically heated multiple cavity hot press mold structure for producing diamond-impregnated abrasive segments. A compact assembly of resistance-heated carbon mold parts which define the various mold cavities, pressure-assimilating conductor rods leading to the assembled mold parts, and steel-reinforced fire brick restraining walls, is conducive toward facile mold set-up and loading operations and affords even temperature and pressure application to the individual mold cavities.

---

The improved multiple cavity hot press mold structure comprising the present invention is designed primarily for large scale or batch production of diamond-impregnated abrasive segments such as are applied to the peripheries of circular stone cutting saw blades or to the outer cylindrical working surfaces of abrasive grinding wheels or drums. Such abrasive segments are usually in the form of small block-like bodies which are of generally rectangular design and consist of sintered metal matrices having crushed or fragmented diamond, tungsten carbide, silicon carbide or other abrasive particles distributed uniformly throughout the same. In the case of a large circular saw blade, such abrasive segments are soldered in spaced relationship to the periphery of the steel saw blade body, while in the case of a cylindrical grinding wheel the segments are soldered in position within circular or helicoidal grooves in the outer surface of the wheel body. Such abrasive segments are made in various ways, but where a hot press method is employed, a mold mixture consisting of powdered metal and abrasive particles is placed in a variable volume mold cavity and the walls of the cavity are moved towards one another in order to decrease the size of the cavity and thus reduce the mold mixture to the desired size and shape, while at the same time heat is applied to the cavity in order to sinter the powdered metal component of the mold mixture.

The present hot press mold structure makes possible the simultaneous pressurized sintering of predetermined amounts of the mold mixture in a relatively large multiplicity of mold cavities for the production of abrasive segments on a batch basis, the structure including a mold assembly proper which is so designed that it is capable of being progressively or sequentially assembled, first, by positioning a series of mold pieces within restraining ring in such a manner as to produce a predetermined number of upwardly opening mold cavities, secondly, by loading the cavities with predetermined amounts of the mold mixture, thirdly, by positioning a second series of mold pieces with respect to the first series so as to close the filled mold cavities, and finally, by placing the thus assembled mold pieces in a press and causing the two series of such pieces to be forced toward each other while at the same time causing them to be heated so as to compress and sinter powdered metal component of the mold mixture in the cavities and thus produce the desired abrasive segments.

The application of heat to the mold cavities during pressurizing of the mold mixture therein is effected by electrical resistance means, the mold pieces being constructed of carbon resistance material. When the two series of assembled mold pieces are positioned in the press, the lower series of mold pieces rests upon a lower composite pressure-applying pad assembly which serves the dual purpose of (1) assimilating the downward thrust of the mold assembly as a whole when pressure is applied thereto by the press, and (2) providing a path for electrical current extending from a bottom electrode platen in associated relation with the press to the assembled mold pieces for resistance heating purposes. In a similar manner, an upper composite pressure-applying pad assembly rests upon the upper series of mold pieces for the purpose of applying downward thrust to the mold assembly as a whole and also completing the path for electrical current from the mold assembly to an upper electrode platen in associated relation with the press.

The novelty of the present structure resides largely in the interfitting relationship between the two series of mold pieces whereby they define therebetween a multiple cavity mold assembly wherein, when press pressure is applied to the upper and lower series of mold pieces tending to force the same toward each other, the size of the mold cavities is uniformly decreased, thus compressing the predetermined amounts of mold mixture contained therein, while at the same time the current flowing through these mold pieces causes resistance-heating thereof for sintering purposes.

Additional novelty resides in the construction of the upper and lower composite pressure pad assemblies whereby multiple current paths are provided between each platen electrode and the mold assembly. The two pressure pad assemblies are substantially identical and each consists of a series of rigid conductive thrust rods which stand on end between a pair of carbon plates, one of which bears against the associated electrode platen and the other of which bears against the mold assembly. The thrust rods project through confining bores in a fire brick heat insulating block and are thus closely confined within the fire brick material. The thrust rods and their associated fire brick block, together with the two carbon plates, assimilate the compressive force of the press and transmit it to the mold pieces for cavity-reducing purposes as previously set forth. The two carbon plates and the multiple thrust rods which are interposed therebetween provide a current path between the associated electrode and the mold pieces. The fire brick block which encompasses each thrust rod functions as a heat confining and distributing member for heat-equalization purposes in the vicinity of the mold assembly. Additional fire brick heat insulation blocks surround the mold assembly proper and are effectively interposed between the latter and the outer restraining ring which surrounds the mold assembly.

The provision of a multi-cavity hot press mold structure such as has briefly been outlined above and possessing the stated advantages, constitutes the principal object of the present invention. Other objects and advantages, not at this time enumerated, will become readily apparent as the following description ensues.

The invention consists in the several novel features which are hereinafter set forth in the following detailed description and are defined by claims at the conclusion hereof.

In the accompanying five sheets of drawings forming a part of this specification, two illustrative embodiments of the invention are shown.

GENERAL DESCRIPTION

Figure 1:
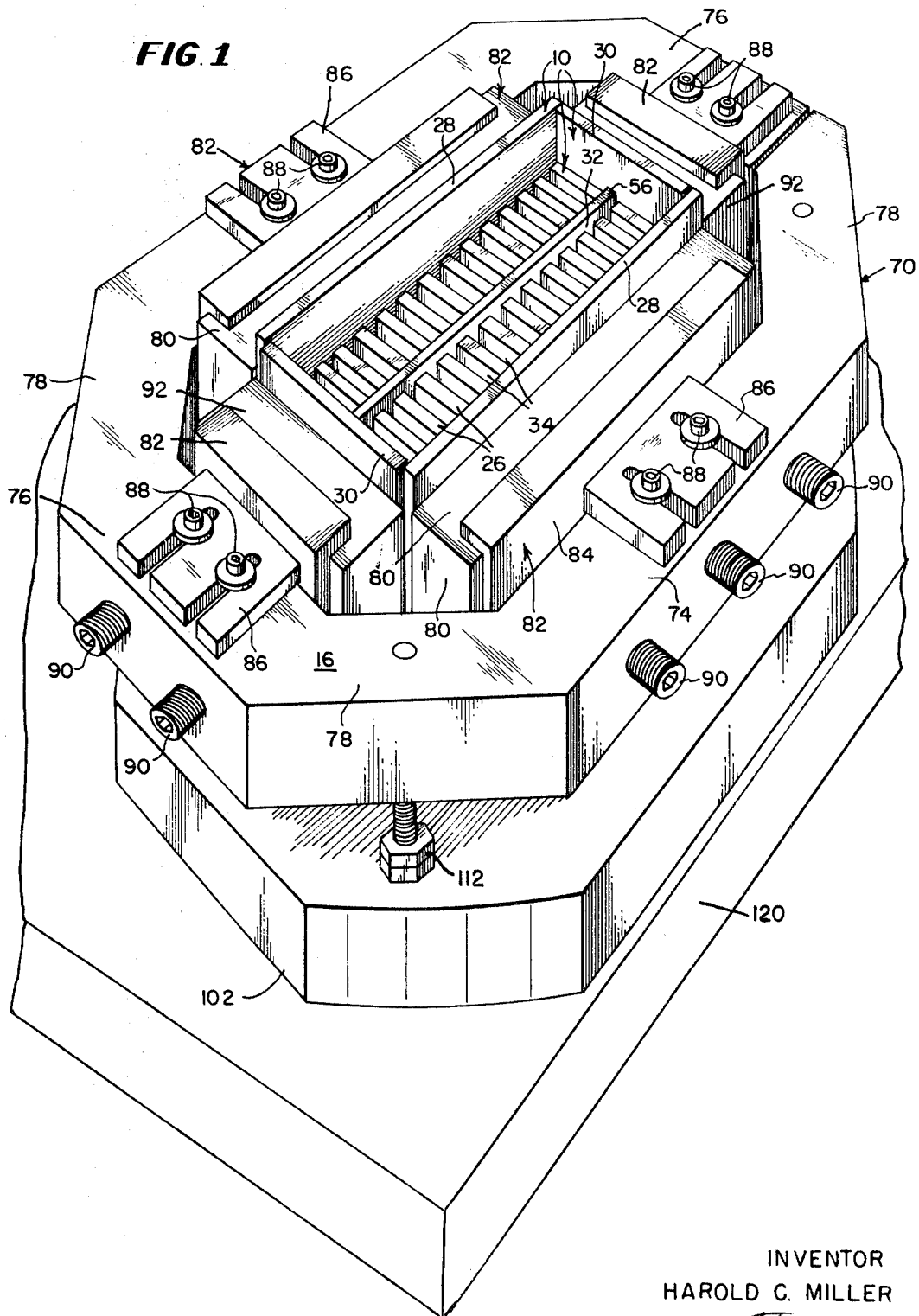
FIG. 1 is a top perspective view of a partially assembled multiple-cavity hot press mold structure embodying the present invention and with only several of the mold pieces in place and prior to application thereto of the upper pressure pad assembly, the view representing one stage of a bench assembly operation.
Figure 2:
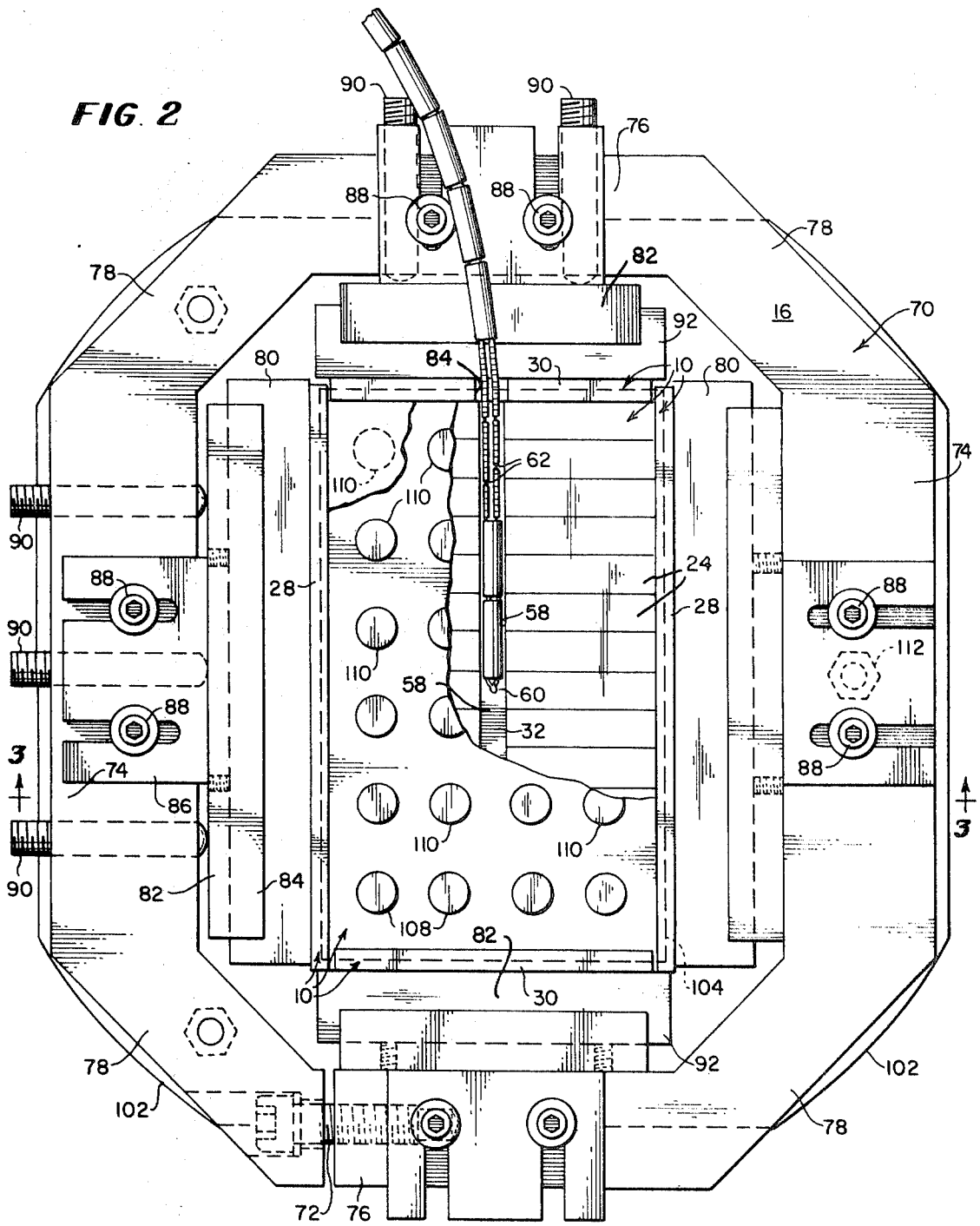
FIG. 2 is a top plan view of the fully assembled mold structure with portions of the upper pressure pad assembly being broken away in order more clearly to reveal the nature of the invention, the mold structure being shown as being operatively positioned between the upper and lower electrode platens of a conventional or standard pressure-applying press.

Referring now to the drawings in detail and in particular to FIGS. 1 to 4, inclusive, the multiple cavity hot press mold structure of the present invention comprises four principal assemblies, namely, a cavity-producing mold assembly 10 which embodies a number of carbon mold parts that are capable of being assembled in step-by-step fashion in order to produce the desired mold cavities; a lower composite pressure pad and electrical conductor assembly 12 which, during bench assembly of the mold structure, constitutes a base upon which the mold assembly 10 is erected; an upper composite pressure pad and electrical conductor assembly 14 which is positioned upon the erected mold assembly 10 after completion thereof; and an encompassing retaining and restraining assembly 16 which surrounds the mold assembly 10 and holds the various mold pieces together against outward separation after the assembled mold structure is positioned in a press and operated upon in a manner that will be described subsequently. The retaining and restraining assembly 16 appears in FIGS. 1 to 3, inclusive, but has been omitted from FIG. 4 in the interests of clarity.

As will be described in greater detail presently, the lower and upper composite pressure pad assemblies 12 and 14 consist of carbon and fire brick parts, the former establishing an electrical path to and from the mold assembly and extending to a pair of electrode platens 20 and 22 (see FIG. 3) between which the assembled mold structure is positioned when it is operatively disposed in the press, and the latter serving to transmit the thrust that is exerted by the two platens to the mold pieces of the mold assembly 10 for cavity-shrinking or reducing purposes.

THE MOLD ASSEMBLY

As previously stated, the mold assembly 10 comprises a multiplicity of mold parts, all of which are formed of resistance carbon. The various mold parts include a plurality of mating pairs of small mold pieces including upper vertically movable pieces 24 (see FIG. 6) and lower fixed pieces 26 (see FIG. 5), together with a pair of mold side plates 28, a pair of mold end plates 30, and a central dividing or partition plate 32. When the various aforementioned mold parts are operatively assembled upon one another, they define a large multiplicity of small variable volume mold cavities 34 (see FIGS. 1 and 3) which are adapted to be filled with predetermined amounts of the mold mixture during one stage of the bench assembly operation so that after the completely assembled mold structure is transferred from the bench to a press for pressure and heat application, the size of the various cavities 34 will be uniformly decreased to produce the desired abrasive segments.

Figure 8:
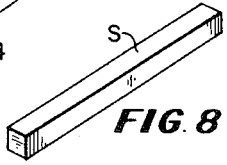
FIG. 8 is a perspective view of a linearly straight abrasive segment which is capable of production by the mold structure of the present invention when employing mold pieces like those shown in FIGS. 5 and 6.

The mold pieces 24 and 26, when operatively assembled with the other mold parts, i.e., the side plates 28, the end plates 30, and the center dividing plate 32, are designed for the production of elongated, linearly straight, rectilinear abrasive segments such as the segment which is shown at S in FIG. 8. For the production of arcuate segments such as the segment which is shown in FIG. 16 and identified by the reference character S2, modified forms of mold pieces which are illustrated in FIGS. 12 to 15, inclusive, and will be described in detail subsequently may be employed in assembled relationship with the side plates 28, the end plates 30 and center dividing plate 32.

As the following description ensues, it will be noted that each of the various aforementioned mold parts, when operatively assembled upon one another, define at least one internal side wall surface of one or more of the mold cavities 34.

Figure 4:
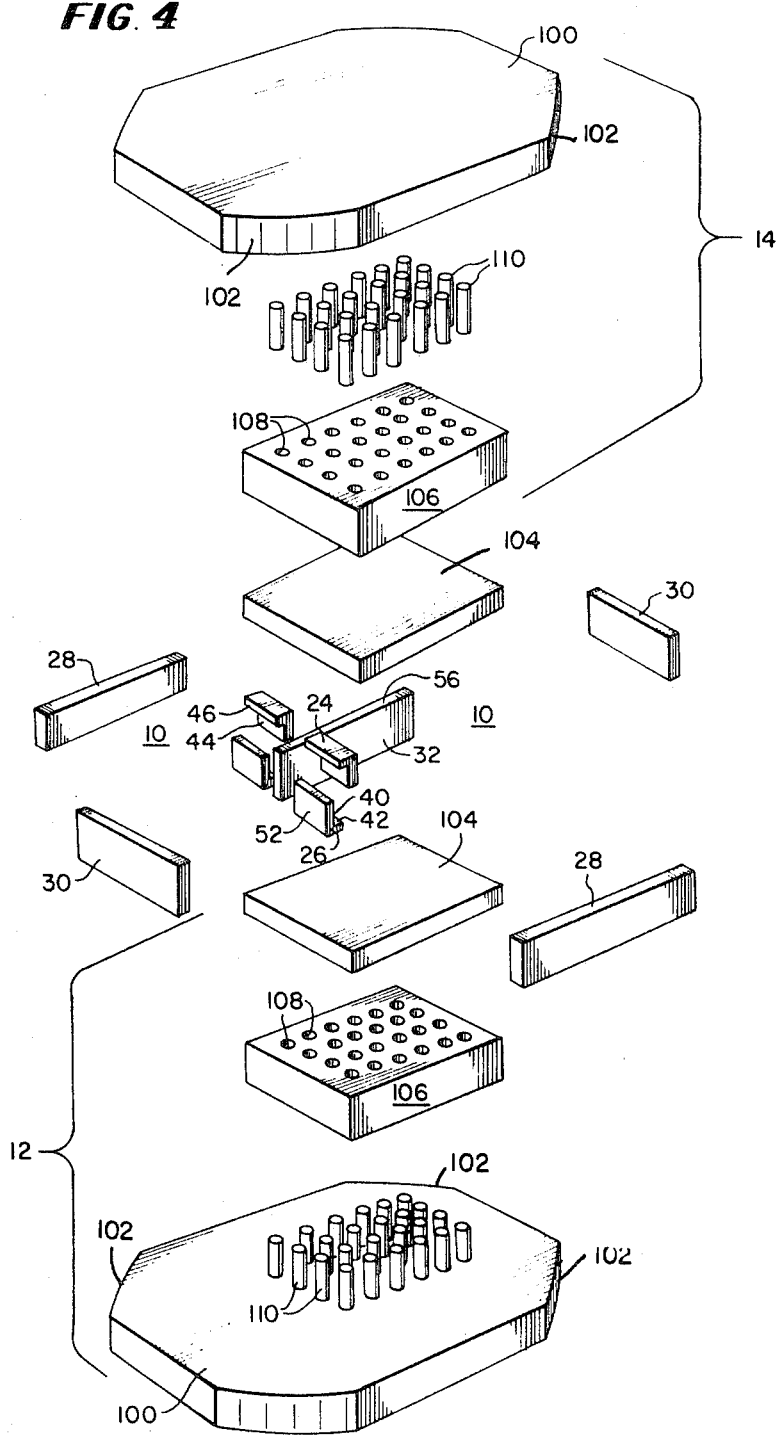
FIG. 4 is an exploded perspective view of the mold assembly and the two composite pressure pads that are associated therewith, the view being exclusive of the mold restraining means and the press electrode platens.
Figure 5:
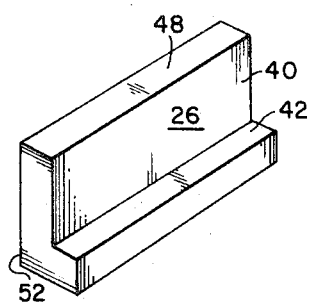
FIGS. 5 and 6 are respective perspective views of one of a plurality of pairs of mating mold pieces which are employed in connection with the present invention for producing linearly straight abrasive segments.
Figure 6:
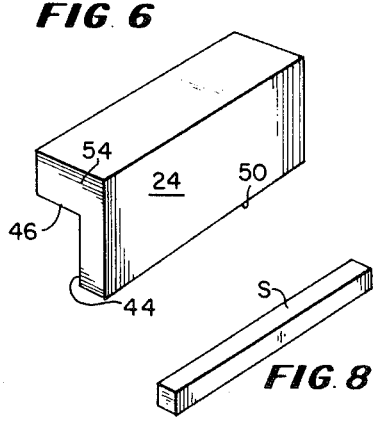

As best illustrated in FIGS. 4 and 5 of the drawings, each lower fixed mold piece 26 is of upright L-shape configuration in transverse cross section, includes a vertical leg which presents an inside planar vertical wall surface 40, and also includes a horizontal leg which presents an inside planar horizontal wall surface 42. Similarly, as shown in FIGS. 4 and 6, each upper vertically movable mold piece 24 is of inverted L-shape configuration in transverse cross section, includes a vertical leg which presents an inside vertical planar wall surface 44, and also includes a horizontal leg which presents an inside horizontal wall surface 46. In the mold assembly 10, the mold pieces 24 and 26 are disposed in mating pairs and are adapted to be assembled upon one another so that the wall surface 44 of a mold piece 24 is in sliding face-to-face engagement with the wall surface 40 of a mold piece 26, it being understood, of course, that the various mold pieces 24 and 26 are of equal length.

Figure 7:
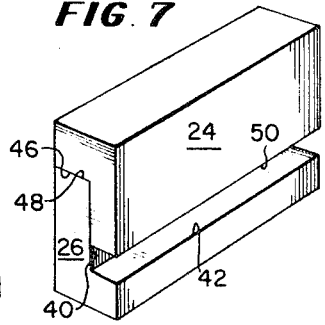
FIG. 7 is an assembled perspective view of the mating mold pieces of FIGS. 5 and 6.

Considering the assembly of any given pair of mating mold pieces 24 and 26, the height of the wall surface 40 is somewhat greater than the height of the wall surface 44, while the over-all thicknesses of both pieces are equal so that when the two pieces 24 and 26 are assembled upon each other and are under full molding pressure as shown in FIG. 7, the wall surface 46 of the mold piece 24 rests upon the upper end face 48 of the mold piece 26, while the lower end face 50 of the mold piece 24 opposes and is spaced from the wall surface 42 of the mold piece 26. The three wall surfaces 40, 42 and 50 thus, in part, define three sides of the associated internal mold cavity 34. The remaining open side of the cavity becomes closed when the next adjacent mating pair of mold pieces 24 and 26 is positioned so that the outside face 52 bridges the gap that is left by the wall surfaces 42 and 50, while the open ends of the cavity 34 become closed by inserting one of the mold side plates 28 and the dividing plate 32 in position during the aforementioned bench assembly operation.

As shown in FIGS. 1 to 4, inclusive, the mold assembly 10 embodies two series or rows of the pairs of mating mold pieces 24 and 26, there being one series on each side of the central dividing plate 32. Since all of the partially closed cavities 34 that are established by the various pairs of mating mold pieces 24 and 26 open in the same direction, each such cavity is closed on one side by the adjacent wall surface 52 as previously described except for the last cavity in each of the two series, these two latter cavities being closed by the remote or farther away end plate 30 as shown in FIG. 1.

Figure 3:
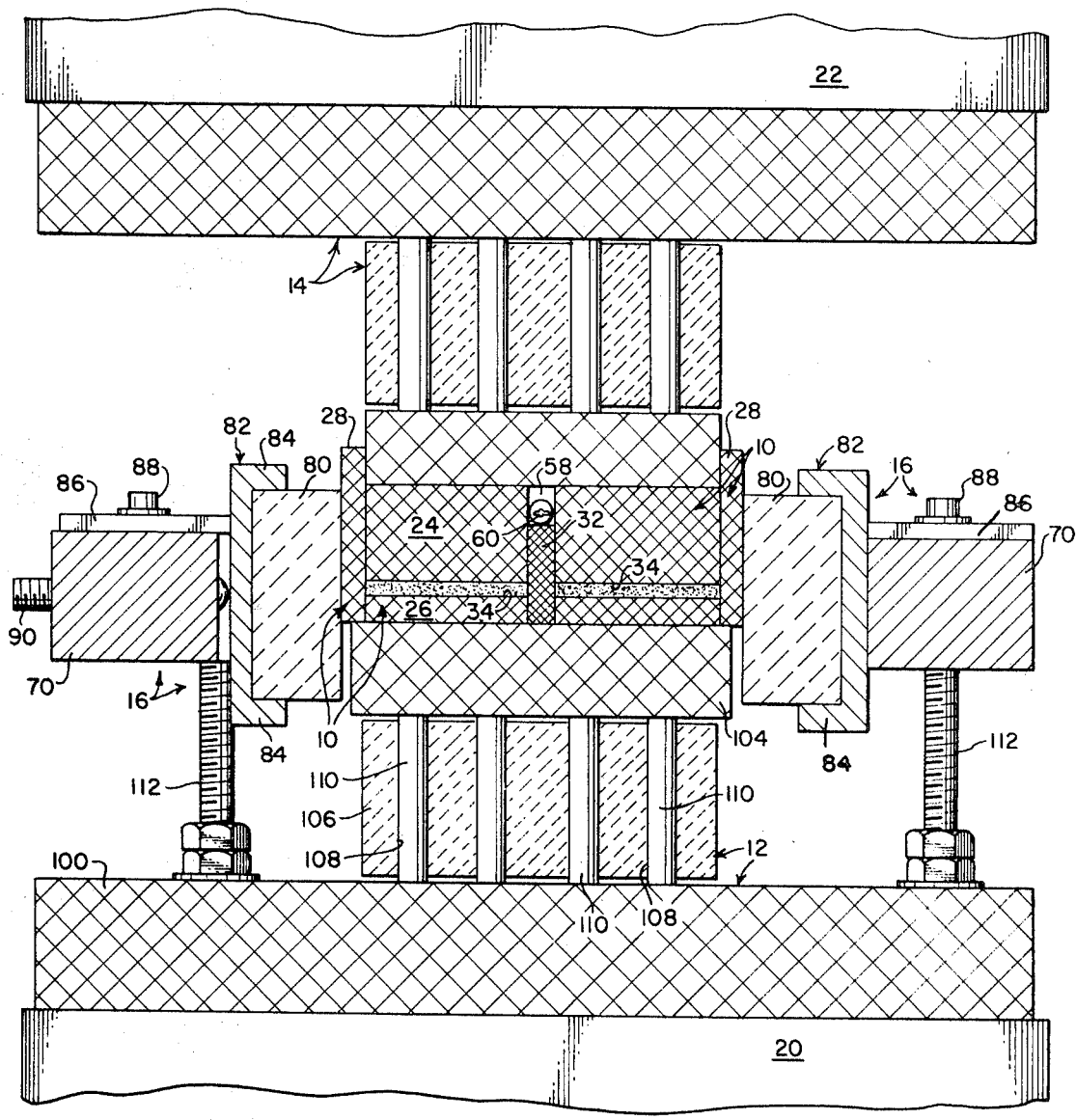
FIG. 3 is a vertical sectional view taken on the line 3—3 of FIG. 2.

It is to be noted from an inspection of FIG. 3 that the height of the central dividing plate 32 is less than the combined height of the various mating mold pieces 24 and 26 so that when the plate 32 is in position between the two series of mating mold pieces, the opposed end faces 54 of the mold pieces 24, in combination with the upper edge 56 of the dividing plate 32, define a longitudinally extending trough 58 for reception therein of a heat-sensitive thermocouple device 60 which is electrically connected to a suitable indicator or heat control mechanism (not shown) by means of which the internal temperature of the mold assembly 10 may be visually ascertained or automatically regulated as the case may be. To accommodate the lead-out connections 62 for the device 60, an opening 64 is formed in one of the carbon end plates 30.

THE RETAINING AND RESTRAINING ASSEMBLY

The retaining and restraining assembly 16 of the mold structure is provided for the purpose of assimilating the outward expansive force of the various mold parts when the heated mold assembly is under compression in the associated press. This assembly includes a split retaining ring in the form of a steel frame 70, the split ends of which are maintained in fixed relationship with respect to each other by means of an adjusting screw 72. Although the adjusting screw may be employed for the purpose of effecting small variations in the effective size of the frame opening, its primary purpose is simply to preserve the split in the frame so that induced electrical currents in the frame arising from the proximity of the frame to the electrical field that is established when heating current flows through the carbon mold parts will not generate an inordinate amount of heat in the mold-encompassing frame.

The frame 70 is of generally octagonal configuration and includes side portions 74 which are disposed on opposite sides of the mold assembly 10, and end portions 76 which are disposed at the opposite ends of said mold assembly. Intervening diagonally extending short sections 78 are disposed at the corner regions of the mold assembly.

Interposed between each side portion 74 of the frame 70 of the retaining and restraining assembly 16 and the mold assembly 10 is a relatively large insulation block 80 which is formed of fire brick. The inside faces of the two blocks 80 bear against the mold side plates 28 in face-to-face relationship. Each block 80 is supported from the frame 70 by means of a spider-like bracket assembly 82 having spaced apart, inwardly extending, confining flanges 84 which partially straddle the block, and also having an outwardly extending, transversely slotted overlay flange 86 which rests upon the upper surface of the adjacent side portion 74 of the frame 70 and is adapted to be secured in any desired position of lateral adjustment thereon by means of a pair of clamping bolt assemblies 88. Three thrust members in the form of adjusting screws 90 project transversely through one side portion 74 of the frame 70 and have their inner ends bearing against the adjacent bracket assembly 82 so that the pressure of the associated fire brick block 80 against the adjacent side of the mold assembly 10 may be adjusted.

Similar fire brick type insulation blocks 92 but of commensurately smaller dimensions are interposed between the end portions 76 of the frame 70 and the mold end plates 30 and are similarly supported from the frame, identical reference numerals being applied to the corresponding similar parts as between the bracket assemblies 82 for the blocks 80 and the bracket assemblies for the blocks 92. Due to the shorter length of the last mentioned bracket assemblies, two of the adjusting screws 90 are adequate for pressure adjusting purposes in connection with the first brick blocks 92.

THE PRESSURE PAD ASSEMBLIES

The lower and upper pressure pad assemblies 12 and 14 are substantially identical in design and construction, the two assemblies being inversely positioned, one above the mold assembly 10 and the other below said mold assembly. The lower pressure pad assembly 12 constitutes a bench supported base for the entire mold structure during initial bench assembly operations. Due to the similarity between the two pressure pad assemblies 12 and 14, it is believed that a description of one of them will suffice for both.

The lower pressure pad assembly 12 involves in its general organization a comparatively large lower carbon block 100 of generally rectangular design. The four corners of the block 100 are truncated and rounded as indicated at 102. The assembly 12 further involves a smaller upper carbon block 104 upon which all of the bottom faces of the various lower mold pieces 26 are supported. Interposed between the lower and upper carbon blocks 100 and 104 is a fire brick insulating block 106. The latter is of rectangular configuration and has extending therethrough a series of vertical cylindrical bores 108. Each bore has disposed therein a conductive carbon thrust pin 110 of elongated cylindrical design, the lower ends of the various pins resting upon the lower carbon block 100 and the upper ends of the pins bearing against the upper carbon block 104. The pins 110 have a loose fit within the bores 108 and they are of slightly greater length than the vertical extent of the bores as clearly shown in FIG. 3 so that in the normal condition of the mold assembly prior to its placement in the press, the fire brick block 106 is floatingly disposed between the two carbon blocks 100 and 104. However, when the mold assembly 10 is disposed in the press and pressure is applied thereto, especially after an appreciable amount of heat has been developed in the mold assembly, the various conductive pins 110 become compressed endwise and move entirely within the confines of the fire brick block 106 so that, in combination with the block, they share the pressure load.

The lower carbon block 100 of the composite pressure pad assembly 12 is adapted, when the mold structure is disposed within the press, to rest upon the lower electrode platen 20. Similarly, the corresponding carbon block of the upper pressure pad assembly 14 is adapted to bear against the upper electrode platen 22 as shown in FIG. 3.

The previously described steel frame 70 of the retaining and restraining assembly 16 is supported in an elevated position and at the general level of the mold assembly 10 by means of a plurality of adjustable vertical supports in the form of anchor bolt devices 112. The lower ends of these anchor bolt devices are suitably secured in the lower carbon block 100 of the lower pressure pad assembly 12 and the upper ends of said devices are suitably secured in the frame 70.

BENCH ASSEMBLY OPERATIONS

The present mold structure lends itself to ease of bench assembly, the structure being shown in FIG. 1 in a partially erected condition and resting on a work bench, a fragment of said bench being designated or identified by the reference numeral 120. It will be assumed that for successive mold setting-up operations, a permanent assembly of the retaining and restraining assembly 16 (including the steel restraining frame 70, and the four fire brick insulating blocks 80 and 92 and their associated bracket assemblies) on the lower carbon block 100 of the lower pressure pad assembly 12 will be made and left in position on the work bench. Then, for any given mold structure assembly operation, the lower, bore-equipped, fire brick block 106 will be centered on the carbon block 100, after which the various conductive carbon thrust pins 110 will be inserted endwise in the bores 108 in the block 106. Thereafter, the upper carbon block 104 of the lower pressure pad assembly 12 will be loosely positioned on the upper protruding ends of the thrust pins 110, thus providing a horizontal base surface for subsequent erection of the multiple cavity mold assembly 10.

To set up the mold assembly 10 on the upper carbon block 104 of the lower pressure pad assembly 12, the four carbon side and end plates 28 and 30 are arranged in quadrilateral relationship and so that the lower edges or surfaces rest upon the block 104 with their outer side surfaces bearing against the fire brick insulating blocks 80 and 92, thus defining an upwardly opening large rectangular tray-like recess 122 for reception of the remaining mold parts. Thereafter, a few of the lower mold pieces 26 are positioned on the upper surface of the block 104 within this tray-like receess 122 and on opposite sides of a longitudinal center line as shown in FIG. 1 so as to form two incomplete rows of such pieces, after which the center dividing plate 32 is interposed between the thus formed rows, thus dividing the recess 122 into two compartments. The remaining lower mold pieces 26 are then set into place until two rows of contiguous pieces have been completed, thus filling the lower region of the tray-like recess and establishing two rows of the partially completed upwardly opening mold cavities 34.

As previously stated, the side wall surfaces 40 of the lower mold pieces fall somewhat short of the upper edge 56 of the center dividing plate 32 and establish the trough for the thermocouple device 60 and its electrical lead-out connections 62. Upon completion of the placement of the various lower mold pieces 26 as described above, the thermocouple is loosely positioned in the trough, after which the open-cavity mold structure or assembly, thus far assembled, is ready for loading with the aforementioned mold mixture.

Loading of the various mold cavities 34 is effected in any convenient manner as, for example, by pouring measured quantities of the mold mixture into the upwardly opening cavities and tamping, screeding, or otherwise attaining an even cavity fill as determined by the upper edge 56 of the center dividing plate 32. After wiping the exposed surfaces of the various mold parts clean, the upper mold pieces 24 are assembled upon the lower mold pieces 26 as indicated in FIG. 7 and so that the lower end faces 50 of these upper mold pieces rest directly upon the mold mixture in the cavities 34 with the various vertical legs of the mold pieces 24 and 26 interlacing each other. When all of the upper mold pieces 24 are in position within the tray-like structure 122 that is formed by the four mold plates 28, 30 and the upper block 104 of the lower pressure pad assembly 12, the carbon block 104 of the upper pressure pad assembly 14 is placed upon the upper surfaces of the upper mold pieces 24, after which the fire brick block 106 of the upper pressure pad assembly is positioned on the block 104 of said upper pressure pad assembly. The upper conductive pins 110 are then inserted in the various holes 108 in the fire brick block 106 of the upper pressure plate assembly 14, after which the carbon plate 100 of said upper pressure pad assembly 14 is placed upon the upper ends of the upper pins 110, thus completing the assembly of the mold structure.

It will be understood that prior to insertion in place of the carbon side and end plates 28 and 30 and the mold pieces 24, 26 of the mold assembly 10, the adjusting screws 90 may be manipulated to attain the proper positioning of the fire brick insulating blocks 80 and 92 for reception of the various mold assembly parts with a fairly snug fit. After the parts of the mold assembly have been progressively built up to completion, these adjusting screws may then be tightened to the desired extent so as to true up the assembled mold parts.

OPERATION OF THE MOLD STRUCTURE

Upon completion of the erection of the mold structure as previously described, the same is transferred to the mold press. The latter may be of conventional or standard design, and except for the upper and lower electrode platens 22 and 20 (see FIG. 3), is not illustrated in the drawings. It will be understood, of course, that, as is the case with most conventional mold presses, the lower electrode platen 20 remains stationary while the upper electrode platen 22 moves downwardly toward the lower platen to compress the mold structure therebetween.

The assembled mold structure is positioned in the press so that the lower carbon block 100 of the lower pressure paid assembly 12 rests squarely upon the lower electrode platen 20 while the corresponding carbon block 100 of the upper pressure pad assembly 14 directly underlies the upper electrode platen 22 as shown in FIG. 3. The press is then operated so as to cause the upper platen 22 to descend while current is supplied to the lower platen 20 for resistance heating purposes. As the upper platen descends, the entire mold structure is placed under vertical compression and all of the various adjacent carbon elements or parts of the entire mold structure are thus caused to make good electrical contact with each other for conduction of electric current from one electrode platen to the other through the all-carbon mold assembly 10. Assuming for purposes of discussion that the direction of current flow is from the lower electrode platen 20 to the upper electrode platen 22 of the press, the current will enter the lower carbon electrode platen 20 and from thence flow through the multiple parallel current paths that are established by the adjacent thrust pins 110 to the upper carbon block 104 of the lower pressure pad assembly 12. The current will then flow through the lower series of mold pieces 26 and the upper series of mold pieces 24 and finally through the carbon block 104, the thrust pins 110, and the carbon block 100 of the upper pressure pad assembly 14 to the upper electrode platen 22. During the heating cycle, the pressure that is exerted upon the mold structure by the two electrode platens 20 and 22 will compress the upper and lower conductive thrust pins 110 to such an extent that they move entirely within the confines of their respective fire brick blocks 106 which encompass them. These pins, together with the blocks 106, thus share the pressure load through both the upper and lower pressure pad assemblies.

Insofar as the mold assembly 10 is concerned, the downward pressure that is imparted to the upper series of mold pieces 26 will cause the lower end faces 50 thereof to bear downwardly upon the mold mixture within the various mold cavities 34 and compress the same during the resistance heating that is occasioned by the flow of current through the upper and lower mold pieces 24 and 26. The mold mixture in the cavities 34 is confined against lateral movement by reason of the side plates 28, while the end plates 30 which are reinforced by the adjacent adjusting screws 90 serve to maintain a solid longitudinally extending column of carbon through the various mold pieces 24, 26 and prevent mold piece separation. The design of the mold pieces 24 and 26 is such that when the wall surfaces 46 of the upper mold pieces 24 ultimately come to rest upon the upper end faces 48 of the lower mold pieces 26, the size and shape of various mold cavities 34 is conformable to the size and shape of the abrasive segments S undergoing molding.

The specific temperature which is involved in the molding operation and the duration of the heating and pressing cycle are predetermined factors which are a function of numerous considerations such as the composition of the mold mixture, the volumetric capacity of the various mold cavities 34, the ohmic resistance of the carbon path through the mold assembly, the electrical current and voltage values, etc. The heat sensitive thermocouple device 60 may be operatively connected to a suitable indicator such as a voltmeter which is calibrated in Fahrenheit degrees or it may be operatively connected in a suitable control circuit by means of which resistance current flow and press operation may automatically be controlled.

After a given batch operation of the mold structure 10 has been completed, the press may be opened and the structure returned to the work bench for mold dismantling operations which are substantially a reverse of the previously described mold assembly operations.

PRODUCTION OF ARCUATE ABRASIVE SEGMENTS

When it is desired to produce arcuate segments such as the segment S2 of FIG. 16, the general arrangement of the mold structure as a whole remains the same as that previously described herein, but the mold assembly 10, instead of employing the straight-sided lower and upper mating mold pieces 24 and 26, employs different mating mold pieces such as are illustrated in FIGS. 9 to 15, inclusive. These different mold pieces are substituted for the upper and lower mold pieces 24 and 26 in the shallow tray-like recess 122 that is established during erection of the mold structure and is defined by the upper carbon block 104 of the lower pressure pad assembly 12 and the four carbon mold side and end plates 28 and 30. The mold structure remains substantially the same as previously described, but a different mold assembly is substituted for the assembly 10.

Figure 9:
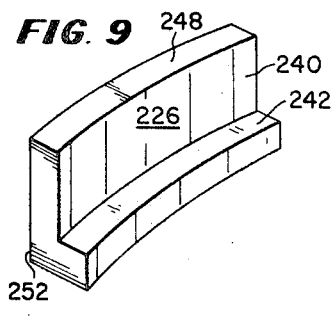
FIGS. 9 and 10 are perspective views similar to FIGS. 5 and 6 but showing a pair of modified mating mold pieces for the production of a curved abrasive segment.
Figure 10:
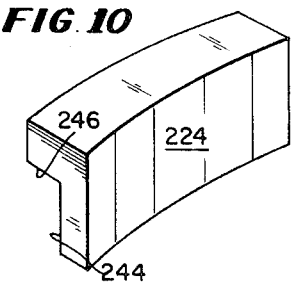
Figure 11:
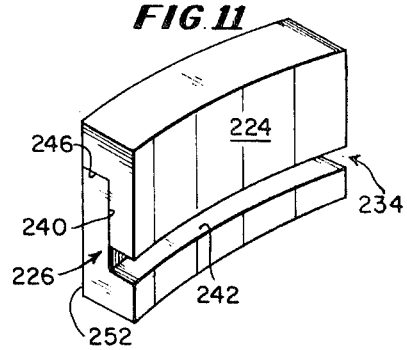
FIG. 11 is an assembled perspective view of the mating mold pieces of FIGS. 9 and 10.

Except for the construction of the special mold pieces of FIGS. 12, 13, 14 and 15, the nature and function of which will be described presently, the mating mold pieces of FIGS. 9, 10 and 11 are generally similar to the mating mold pieces 24 and 26 of FIGS. 5, 6 and 7 and, therefore, in order to avoid needless repetition of description, similar reference numerals but of a higher order have been applied to the corresponding parts as between the disclosures of FIGS. 9, 10 and 11 and FIGS. 5, 6, and 7, respectively.

For the understanding of the nature and function of the lower mold pieces 224 and the upper mold pieces 226, it is not deemed necessary to illustrate the mold assembly of which they constitute functional elements. These mold pieces are useable in connection with the retaining and restraining assembly 16, the lower pressure pad assembly 20 and the upper pressure pad assembly 22 of the previously described mold structure with no modification whatsoever of these principal mold structure assemblies.

As shown in FIG. 9, the outside wall surface 252 of each lower mold piece 226 is of convex configuration, while the inside wall surface 240 is of concave configuration, the radius of curvature of these two surfaces being commensurate with that of the arcuate segment S2 (see FIG. 16) which is to be formed. The L-shape cross-sectional shape of each lower mold piece 226 is closely similar to that of the lower mold piece 26 of FIG. 5, but the opposite sides or wall surfaces of each lower mold piece 226 are of curved semi-cylindrical design. As shown in FIG. 10, each upper mold piece 224 likewise has a cross-sectional shape closely similar to that of the upper mold piece 24 of FIG. 6, but the opposite sides or wall surfaces thereof are curved on a radius equal to that of the outside and inside wall surfaces of the mating lower mold piece 226. When the two mating upper and lower mold pieces 224 and 226 are assembled upon each other and press pressure is applied thereto, the arcuate underneath or downwardly facing inside horizontal wall surface 246 of the upper mold piece 224 rests upon the arcuate upper end face 248 of the lower mold piece 226 while the curved inside wall surfaces 244 and 240 of the two mold pieces make face-to-face contact with each other. Under such conditions, the arcuate upwardly facing horizontal wall surface 242 of the lower mold piece 224 opposes and is spaced from the inner portion of the arcuate downwardly facing horizontal wall surface 246 of the upper mold piece 226 and, in combination with the exposed portion of the wall surface 240 (see FIG. 11) establishes the open-sided mold cavity 234.

Figure 12:
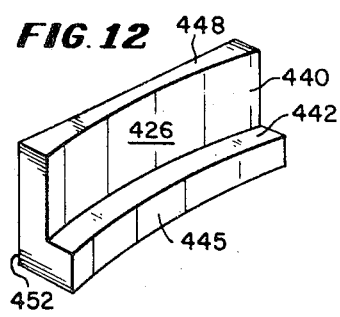
FIGS. 12 and 13 are perspective views showing a pair of special mold pieces for use in conjunction with the mold pieces of FIGS. 9 and 10 but at the opposite ends of the mold assembly.
Figure 13:
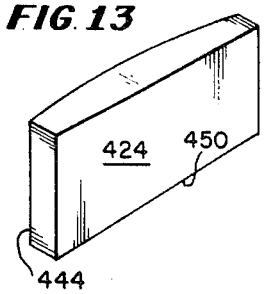

It will be apparent that each pair of mating upper and lower mold pieces 224 and 226 when assembled upon each other is capable of intimate nesting relationship with an adjacent and like pair of mating mold pieces so that a large expanse of the upper surface of the upper block 104 will be coextensively covered by the thus nested lower mold pieces 226 in the two rows thereof. However, at the opposite ends of the mold assembly which is established by the use of the upper and lower mold pieces 224 and 226, it is necessary that special mold pieces 424 and 426 such as are shown in FIGS. 12, 13, 14 and 15 be employed to accommodate the planar inside faces of the two end plates 30 of the mold assembly 10. Utilizing reference numerals of a still higher order to designate the corresponding parts as between the disclosures of FIGS. 12 and 13 and 9 and 10, respectively, the special mold piece 426 of FIG. 12 is substantially identical with the lower mold piece 226 of FIG. 9 except for the fact that the outside wall surface 452 thereof is planar instead of being curved. The special mold piece 424 of FIG. 13, however, differs appreciably from the upper mold piece 224 of FIG. 10 in that the outside wall surface is planar or flat and the inside wall surface 444 thereof is curved and of the same vertical extent as that of the outside wall surface of the upper mold piece 224 and there is no arcuate or downwardly facing horizontal wall surface corresponding to the wall surface 246 of the upper mold piece 224. The special mold piece 424 is the same in height as the lower mold piece 226 of FIG. 9.

Figure 14:
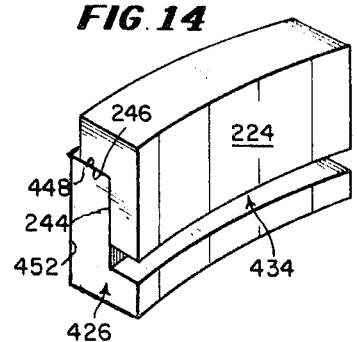
FIG. 14 is a perspective view of the special mold piece of FIG. 12 showing the same in assembled relation with the mold piece of FIG. 10.

Two of the special mold pieces 426 are employed, one for each row of mold pieces in the mold assembly. Two of the special mold pieces 424 likewise are employed. These mold pieces 424 and 426 do not mate with each other. Each mold pieces 426 is an end filler piece and is useable in connection with the adjacent upper mold pieces 224 in an obvious manner, the assembly being illustrated in FIG. 14 wherein the convex surface 244 of the upper mold piece 224 bears against the concave surface 440 of the special mold piece 426, and the horizontal wall surface 246 of the upper mold piece 224 rests upon the upper end face 448 of the special mold piece 426 when the two mold pieces 224 and 426 are under pressure in the press. Two mold piece assemblies 22 and 426 such as are shown in FIG. 14 are employed at one end of the mold piece receiving recess 122, each assembly being similar to that of FIG. 11 except for the fact that the convex outside surface 252 of the lower mold piece 226 is replaced by the flat or planar outside surface 452 of the special mold piece 426 to accommodate the planar inside face of the adjacent end plate 30 against which it bears.

Figure 15:
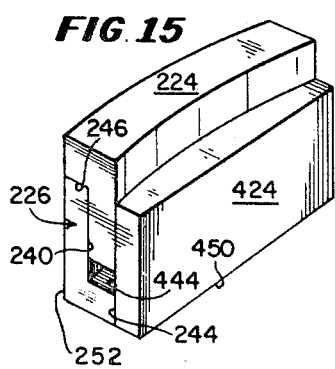
FIG. 15 is a perspective view of the special mold piece of FIG. 13 showing the same in assembled relation with the mold pieces of FIGS. 9 and 10.
Figure 16:
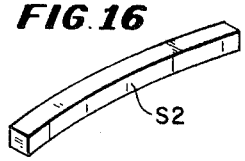
FIG. 16 is a perspective view of an arcuate abrasive segment which is capable of production by the mold structure of the present invention when employing mold pieces like those shown in FIGS. 9 to 14.

Each of the two mold pieces 424 is an end filler piece and is useable in connection with the adjacent pair of mold pieces 224 and 226, an assembly in the form of mold pieces 226, 224 and 424 being illustrated in FIG. 15 wherein the lower portion of the convex inside surface wall 444 of the special mold piece 424 fits against the concave side surface 445 of the bottom leg of the lower mold piece 226 and the upper portion of said convex wall surface 444 fits against the concave outside wall surface 447 of the upper mold piece 224. The flat outside surface of the special mold piece 424 bears flatly aaginst the adjacent end plate 30. The two special mold pieces 424 are thus blanks or filler members which are designed for use with the two outermost upper mold pieces 224 to adapt the latter to the flat or planar inside surface of the adjacent end plate 30.

It will be understood that the bench erection of a mold assembly employing the various mold pieces 224, 226, 424 and 426 is similar to that employed in connection with erection of the mold assembly 10, as is the operation thereof so that a detailed description thereof need not be made herein.

The invention is not to be limited to the exact arrangement of parts shown in the accompanying drawings or described in this specification as various changes in the details of construction may be resorted to without departing from the spirit or scope of the invention. For example, the various mold pieces 24, 26, 224, 226, 424 and 426 may be modified in their configurations to produce mold assemblies which give other shapes htan those exhibited by the abrasive segments S and S2, such modified mold pieces cooperating with the upper and lower pressure pad assemblies 14 and 12, and with the side and end mold plates 28 and 30 in the same manner as do the illustrated mold pieces. Therefore, only insofar as the invention is particularly pointed out in the accompanying claims is the same to be limited.

Having thus described the invention what I claim as new and desire to secure by Letters Patent is:

1. A multiple-cavity hot press mold structure adapted for the production of elongated abrasive segments and comprising: a mold assembly comprised of carbon resistance parts including a series of fixed lower mold pieces each of which is of upright L-shape in cross section so as to present a horizontal leg and a vertical leg, said lower mold pieces being arranged in a longitudinal row, similarly oriented, and disposed in tandem contiguity with the adjacent horizontal legs thereof abutting each other so that the vertical legs project upwardly in spaced apart relationship and, in combination with the lower legs, define a horizontal row of upwardly and laterally opening pockets adapted to be filled with a mold mixture, a series of vertically movable upper mold pieces each of which is of inverted L-shape in cross section so as to present a horizontal leg and a vertical leg, the vertical extent of the vertical legs of the upper mold pieces being less than the vertical extent of the vertical legs of the lower mold pieces, the mold pieces of the upper and lower series being arranged in mating pairs with the vertical legs of the former series interlacing the vertical legs of the latter series so as to project downwardly into said pockets, the horizontal legs of the upper mold pieces overlying the vertical legs of the lower mold pieces so as to limit the downward projection of the vertical legs of the upper mold pieces into said pockets, a pair of side plates common to all of the pockets and bearing against the opposite side edges of the mold pieces and closing the lateral ends of said pockets, said mold pieces and side plates thus defining a plurality of variable-volume closed mold cavities within which the mold mixture is adapted to be compressed, a lower mold block underlying said lower mold pieces and on which the latter are supported, and an upper mold block overlying said upper mold pieces and bearing thereagainst; restraining means encircling said mold assembly and confining the mold pieces against lateral shifting and longitudinal separation; a lower heat-insulating pressure pad assembly underlying said lower mold block and supporting the same; and an upper heat insulating pressure pad assembly overlying the upper mold block and bearing thereagainst; each of said pressure pad assemblies including means for establishing a conductive current path extending to the adjacent mold block from a pair of press electrode platens.

2. A multiple-cavity hot press mold structure as set forth in claim 1 and wherein the thickness of the horizontal leg of each upper mold piece in the longitudinal direction of the mold structure is equal to the corresponding thickness of the horizontal leg of the associated lower mold piece, and also to the combined thickness of the vertical legs of such mold pieces.

3. A multiple-cavity hot press mold structure as set forth in claim 1 and wherein said mold pieces are linearly straight in the transverse direction of the mold structure so that the cavities produced thereby are rectangular in both the longitudinal and transverse directions of the mold structure.

4. A multiple-cavity hot press mold structure as set forth in claim 1 and wherein said mold pieces are of uniform arcuate curvature in the transverse direction of the mold structure so that the cavities produced thereby are rectangular in their own transverse direction and curved in their own longitudinal direction.

5. A multiple-cavity hot press mold structure as set forth in claim 1 and wherein the horizontal legs of the lower mold pieces extend in the same longitudinal direction of the mold structure so that all of the mating pairs of mold pieces are similarly oriented within the mold structure.

6. A multiple-cavity hot press mold structure as set forth in claim 5 and including, additionally, an additional carbon resistance part in the form of an end plate bearing against the upper and lower pair of mating mold pieces at one end of said longitudinal row and closing one side of the cavity defined by such mold pieces.

7. A multiple-cavity hot press mold structure as set forth in claim 1 and wherein each pressure pad assembly embodies a fire brick block having vertically extending bores therethrough, a series of carbon thrust pins projecting through said bores, and a pair of carbon blocks on opposite sides of said fire brick block and against which the opposite ends of the thrust pins bear.

8. A multiple cavity hot press mold structure as set forth in claim 7 and wherein the length of said thrust pins is slightly greater than the vertical thickness of the fire brick block and the pins are loosely disposed in the bores so as to be vertically slidable therein whereby, when resistance current flows through the pins and the latter are under endwise compression, the pins are reduced in length to the thickness of the fire brick block so that press load is divided between the fire brick block and the pins.

9. A multiple-cavity hot press mold structure as set forth in claim 7 and wherein said restraining means is in the form of a closed metal frame surrounding the mold assembly, a series of heat-insulating blocks interposed between said frame and the mold assembly and bearing against the latter, and a series of adjusting screws extending between the heat-insulating blocks and frame for adjusting the pressure of said heat-insulating blocks against the mold assembly.

10. A multiple-cavity hot press mold structure as set forth in claim 9 and wherein said closed metal frame is provided with a transverse slit therein which defines a pair of opposed, spaced apart end faces, and an adjusting screw effective to vary the distance between said end faces and thus vary the over-all transverse dimensions of the frame.

11. In a multiple-cavity hot press mold structure for sintering powdered materials into shapes, a plurality of carbon resistance parts including a rectangular horizontal mold piece supporting block, side and end plates projecting vertically upwardly from the marginal edges of said block and, in combination with the upper face thereof, defining an upwardly opening tray-like recess, a vertical partition plate supported on said block and extending between said end plates, thus dividing the recess into two compartments, and a plurality of pairs of mating mold pieces disposed in each compartment, each pair including a fixed lower mold piece of upright L-shape cross section and having a horizontal leg supported on said block and a vertical leg, and an upper movable mold piece of inverted L-shape cross section and having a horizontal leg overlying the upper edge of the vertical leg of the lower mold piece and a vertical leg slidable against the vertical leg of the lower mold piece and overlying the horizontal leg of the lower mold piece, the vertical extent of the vertical leg of the upper mold piece being less than that of the vertical leg of the lower mold piece whereby the upper face of the horizontal leg and the inside face of the vertical leg of the lower mold piece, together with the bottom edge of the vertical leg of the upper mold piece, in combination with one another, establish a three-sided mold cavity having a forwardly opening side and laterally opening ends, all of said mating mold pieces spanning the distance between said partition plate and the adjacent side plate whereby the open ends of the cavities are closed by said latter two plates, adjacent pairs of mold pieces being disposed in tandem contiguity whereby the vertical leg of each lower mold piece closes the open side of the mold cavity associated with a next adjacent mating pair of mold pieces, and a second horizontally disposed block common to and supported on the horizontal legs of all of the upper mold pieces, said mold structure being adapted for insertion in a mold press for application of resistance current and press pressure to said horizontally disposed blocks.

12. In a multiple-cavity hot press mold structure, the combination set forth in claim 11, wherein the vertical extent of said partition plate is less than the vertical extent of the over-all vertical extent of the mating pairs of mold pieces whereby the mold pieces in adjacent compartments project above the level of said partition plate and, in combination therewith, define, in effect, a trough-like void which is bridged by said second horizontally disposed block, said structure further including a heat sensitive thermocouple device disposed in said trough-like void and adapted for electrical connection to a heat indicating device.

13. In a multiple-cavity hot press mold structure, the combination set forth in claim 11, wherein the thickness of the horizontal leg of each upper mold piece in the longitudinal direction of the mold structure is equal to the corresponding thickness of the lower horizontal leg of the associated lower mold piece, and also to the combined thicknesses of the vertical legs of such mold pieces.

14. In a multiple-cavity hot press mold structure, the combination set forth in claim 12, wherein said mold pieces are linearly straight in the transverse direction of the mold structure so that the cavities produced thereby are rectangular in both the longitudinal and transverse directions of the mold structure.

15. In a multiple-cavity hot press mold structure, the combination set forth in claim 12, wherein said mold pieces are of uniform arcuate curvature in the transverse direction of the mold structure so that the cavities produced thereby are rectangular in their own transverse direction and curved in their own longitudinal direction.

References Cited

UNITED STATES PATENTS

| | | | |
|---|---|---|---|
| 2,101,015 | 12/1937 | Anderson | 18—34R |
| 2,156,459 | 5/1939 | Mucher | 18—16RX |
| 2,195,297 | 3/1940 | Engle | 18—16.5X |
| 2,360,528 | 10/1944 | Talmage | 18—16.5X |
| 2,407,123 | 9/1946 | Allison | 18—16R |
| 3,149,374 | 9/1964 | Wagner | 18—16R |
| 3,161,937 | 12/1964 | Gjertsen | 18—16RX |

J. HOWARD FLINT, Jr., Primary Examiner

U.S. Cl. X.R.

18—38